3,259,461
METHODS FOR MEASURING THE CORROSION RATE OF TEST SPECIMENS OR THE LIKE
Roger C. Griffin, Jr., and Nathaniel A. Lewis III, Henrico County, Va., assignors to Reynolds Metals Company, Richmond, Va., a corporation of Delaware
Filed Aug. 23, 1961, Ser. No. 133,477
9 Claims. (Cl. 23—230)

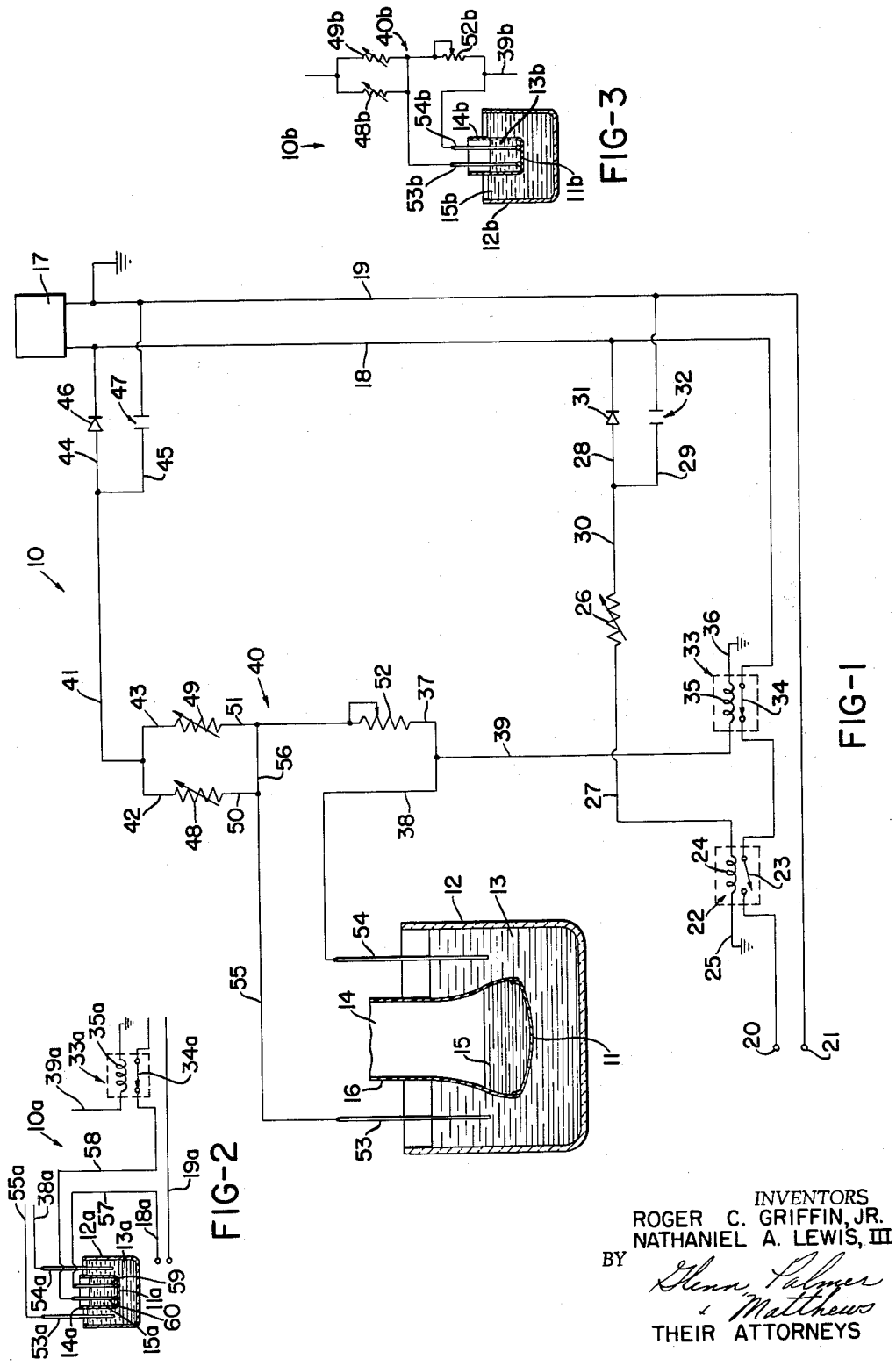

This invention relates to improved apparatus and methods for measuring the corrosion rate of test specimens or the like.

Heretofore, various methods and apparatus have been utilized to measure the corrision rate of various corrosive liquids on metals or the like.

One such prior-known method includes the steps of immersing the test specimen in a body of a desired corrosive liquid and, thereafter, periodically measuring the change in thickness of the test specimen. However, this method does not take into account the fact that the test specimen is not uniform throughout the entire surface area thereof, whereby the corrosive liquid may pit certain parts thereof to a greater degree than in other parts thereof.

Accordingly, another prior-known apparatus was devised to determine when a corrosive liquid completely eats through a metal test specimen. This prior-known apparatus included a normally opened switch located beneath a test specimen supporting a desired corrosive liquid on the upper side thereof. When a sufficient amount of the corrosive liquid eats through the test specimen and falls on to the opened switch, the switch is closed and stops a timer which indicates the length of time it takes for that particular corrosive liquid to eat through that particular test specimen.

However, it has been found that an indeterminable time delay is present in this latter method because the surface tension of the corrosive liquid forms droplets on the underside of the test specimen. Such droplets will only fall to the switch mechanism when the droplets become of a size sufficient to overcome such surface tension. Therefore, the time rate measured by this prior-known apparatus is dependent upon indeterminable factors, i.e., the size of the various holes formed in the particular test specimen and the amount of corrosive liquid necessary to close the switch mechanism. Accordingly, the corrosive liquid can actually eat through the test specimen at a particular point thereof without the prior-known apparatus detecting the same, because the amount of corrosive liquid passing through such opening or pit in the test specimen may be insufficient to overcome the surface tension of the corrosive liquid and/or the subsequent amount of liquid falling to the switch mechanism may be insufficient to actuate the same.

According to the teachings of this invention, however, improved methods and apparatus are provided wherein the corrosion rate of a test specimen can be accurately measured without attempting to compensate for any of the indeterminable factors present in the prior-known methods, because this invention provides means for substantially instantaneously sensing the first microscopic amount of corrosive liquid that eats through a test specimen.

In particular, one embodiment of the apparatus of this invention includes a first receptacle containing a liquid having a known electrical resistance. A second receptacle for receiving a desired corrosive liquid is immersed in the first receptacle and has at least part of a wall thereof formed from a metal test specimen that separates the corrosive liquid from the liquid in the first receptacle.

A pair of electrodes are disposed in the liquid of the first receptacle and are respectively interconnected to a timer circuit whereby the timer circuit senses the resistance value of the liquid in the first receptacle. As long as the resistance value of the liquid in the first receptacle remains at its normal resistance value, the timer continues to run. However, as soon as the corrosive liquid forms the first subcapillary pit through the test specimen, ions from the corrosive liquid enter the liquid in the first receptacle under the influence of osmotic pressure and immediately change the electrical resistance value of the liquid in the first receptacle. This change of resistance value of the liquid in the first receptacle is immediately sensed by the apparatus of this invention, whereby the timer is stopped to indicate the length of time it took the corrosive liquid to eat through the test specimen. In this manner, the corrosion rate of the test specimen can be readily and accurately determined without any attempt to compensate for any indeterminable factors, as in prior-known methods and apparatus.

Accordingly, it is an object of this invention to provide an improved method for measuring the corrosion rate of a test specimen or the like.

Another object of this invention is to provide an improved apparatus for measuring the corrosion rate of a test specimen or the like.

Other objects, uses, and advantages of this invention are apparent from a reading of this description, which proceeds with reference to the accompanying drawings forming a part thereof and wherein:

FIGURE 1 is a schematic view illustrating one apparatus of this invention for measuring the corrosion rate of a test specimen or the like.

FIGURE 2 is a view similar to FIGURE 1 and illustrates part of another apparatus of this invention.

FIGURE 3 is a view similar to FIGURE 1 and illustrates part of still another apparatus of this invention.

While the various features of this invention are hereinafter described as being particularly applicable for measuring the corrosion rate of a metal test specimen or the like, it is to be understood that the various features of this invention can be utilized for other purposes, as desired. Therefore, this invention is not to be limited only to the application thereof illustrated in the drawings, because the drawings are merely utilized to illustrate one of the wide variety of uses of this invention.

Referring now to FIGURE 1, an improved apparatus of this invention for measuring the corrosion rate of a test specimen is schematically illustrated and is generally indicated by the reference numeral 10.

The apparatus 10 is adapted to accurately measure the corrosion rate of the metal test specimen 11 in a manner hereinafter described, the apparatus 10 immediately sensing and indicating when the first subcapillary pit is formed through the test specimen 11 by a desired corrosion means.

The apparatus 10 includes a first receptacle 12 formed of any suitable non-conductive material, such as glass or the like, the receptacle 12 containing a supply of liquid 13, such as distilled water or the like, that has a relatively high electrical resistance value as compared to the resistance value provided by a corrosive liquid.

A second receptacle 14 is adapted to be immersed in the liquid 13 of the first receptacle 12, in the manner illustrated in FIGURE 1, and is adapted to contain a desired corrosive liquid or corrosion means 15, such as a 20% solution of sodium chloride or the like. The second receptacle 14 can be formed in any suitable manner whereby the desired test specimen 11 forms at least part of a wall thereof and separates the corrosive liquid 15 from the liquid 13 in the receptable 12.

In particular, the receptacle 14 illustrated in FIGURE 1 comprises a tubular sleeve 16 formed from a suitable material which is non-reactive with the corrosive liquid 15. For example, the sleeve 16 can comprise a polyester film coated with polyethelene or the like. In this manner, the desired test specimen 11 is adapted to be heat-sealed to the sleeve 16 to seal off one of the open ends of the sleeve 16 and form a pouch-like receptacle 14.

However, it is to be understood that the embodiment of the receptacle 14 illustrated in the drawings is merely emblematic of one means for forming a receptacle, whereas other types of receptacles may be provided, the important feature being that the test specimen 11 completely separates the corrosive liquid 15 from the liquid 13 in the receptacle 12 when the receptacle 14 is immersed therein.

The test specimen 11 is usually a sample taken from a large supply of like material so that the corrosion rate of the supply can be estimated, for a particular corrosive liquid, from a measurement of the corrosion rate of the test specimen 11. For example, the test specimen 11 can comprise a sample taken from a large supply of metal foil, such as aluminum-containing metallic foil and the like, whereby the corrosion rate of the test specimen 11 can be measured by the apparatus 10 to determine the corrosion rate of the supply of foil when attacked by the particular corrosive liquid 15.

An electrical timer 17 is utilized to measure the length of time it takes for the corrosive means 15 to eat through the test specimen 11 and enter the liquid 13 contained in the first receptacle 12 in a manner hereinafter described.

The timer 17 is adapted to be supplied with alternating current by a pair of leads 18 and 19, respectively interconnected to a suitable source of alternating current at points 20 and 21, in a manner well known in the art.

The apparatus 10 is so constructed and arranged that the timer 17 is initially supplied electrical current by the leads 18 and 10 when the switch 23 in the lead 18 is manually closed as hereinafter described and continues to run until the corrosive liquid 15 forms the first subcapillary pit through the test specimen 11 and thereby causes the electrical current supplied to the timer 17 to be terminated, whereby the timer 17 indicates the length of time it took a particular corrosive liquid 15 to eat through the test specimen 11.

A first relay 22 is disposed in the lead 18 and comprises a normally opened switch 23 and a coil 24, the coil 24, when energized, being adapted to hold the switch 23 in the closed position, in a manner hereinafter described, and, when de-energized, permitting the switch 23 to return to its normally opened position. While the relay 22 can be formed in any desired manner, the embodiment thereof illustrated in the drawings comprises a 0.025 ampere, 110 volt, A.C., multi-contact relay.

One side of the coil 24 is connected to ground by a lead 25. The other side of the coil 24 of the relay 22 is connected to one side of a variable resistor 26 by a lead 27, the embodiment of the resistor 26 illustrated in the drawings comprising a 5000 ohm, 25 watt, adjustable resistor. The other side of the variable resistor 26 is interconnected to a pair of leads 28 and 29 by a lead 30.

The lead 28 is connected to the main power lead 18 and contains a D.C. rectifier 31. The rectifier 31 can be formed in any suitable manner to convert the alternating current supplied by the lead 18 to direct current, whereby the coil 24 of relay 22 can be energized by the current supplied by the rectifier 31. For example, the rectifier 31 can comprise a silicon, 110 volt, D.C. power supply rectifier.

The lead 29 is interconnected to the main power lead 19 and includes a capacitor 32 to be utilized as a filter for alternating current ripple, in a manner well known in the art. The embodiment of the capacitor 32 illustrated in the drawings comprises a 150 W.V.D.C., 150 mfd. capacitor.

In this manner, when the switch 23 in the lead 18 is manually closed, alternating current is supplied to the timer 17 to energize the same, and direct current is instantaneously supplied to the coil 24 of the relay 22 to hold the switch 23 in its closed position.

A second relay 33 is disposed in the lead 18 between the relay 22 and the timer 17 and includes a normally closed switch 34 and a coil 35, the coil 35, when energized, being adapted to open the switch 34 and terminate the supply of current being delivered to the timer 17 to thus stop the timer 17 in a manner hereinafter described. The thus opened switch 34 also causes the direct current being supplied to the coil 24 of the relay 22 to be terminated, whereby the de-energized coil 24 permits the switch 23 to be automatically opened to prevent further actuation of the timer 17 until the switch 23 is again closed manually by the operator of the apparatus 10. Therefore, after the switch 23 of the relay 22 is opened in this manner, the coil 35 of the relay 33 can be de-energized, permitting the switch 34 to close, whereby the apparatus 10 will be in its de-activated condition, as illustrated in FIGURE 1.

The embodiment of the relay 33 illustrated in the drawings comprises a 0.025 ampere, 110 volt, A.C., multi-contact relay in the same manner as the relay 22 previously described.

One side of the coil 35 of the relay 33 is interconnected to ground by a lead 36. The other side of the coil 35 is interconnected to a pair of leads 37, 38 by a lead 39.

The leads 37 and 38 form part of a resistance bridge network generally indicated by the reference numeral 40 and having one end thereof interconnected to the coil 35 of the relay 33 by the lead 39, and the other end thereof interconnected to the leads 18 and 19 by a lead 41.

The lead 41 is interconnected at one end thereof to a pair of leads 42 and 43 forming part of the resistance bridge network 40. The other end of the lead 41 is interconnected to a pair of leads 44 and 45, respectively connected to the main power leads 18 and 19 in substantially the same manner as the leads 28 and 29 previously described.

In particular, the lead 44 includes a D.C. rectifier 46 which is adapted to convert the alternating current from the lead 18 to direct current and supply the direct current to the bridge network 40 through the lead 41. The lead 45 includes a capacitor 47 to filter any A.C. ripple in the manner previously described.

The embodiment of the rectifier 46 illustrated in the drawings comprises a silicon, 100 volt, D.C. rectifier in the same manner as the rectifier 31. The capacitor 47 comprises a 150 W.V.D.C., 150 mfd. capacitor in the same manner as the capacitor 32.

A pair of variable resistors 48 and 49 are respectively connected to the free ends of the leads 42 and 43 and are disposed in parallel with each other. The other sides of the variable resistors 48 and 49 are respectively connected to a pair of leads 50 and 51.

While the resistors 48 and 49 can be formed in any suitable manner, the embodiment of each resistor 48 and 49 illustrated in the drawings comprises a 250 ohm, 250 watt variable resistor.

The lead 37 has the free end thereof interconnected to one side of a variable resistor 52, the variable resistor 52 having the other side thereof interconnected to the lead 51 connected to the variable resistor 49. In this manner, the variable resistors 49 and 52 form one side of the bridge 40, with the resistors 49 and 52 being disposed in series.

The embodiment of the resistor 52 illustrated in the drawings comprises a 500 ohm, 100 watt variable resistor utilized in a manner hereinafter described.

The other side of the bridge 40 is formed by the variable resistor 48 in series with the resistance provided by the liquid 13 in the first receptacle 12 in the following manner.

A pair of electrodes 53 and 54 are respectively immersed in the liquid 13 of the receptacle 12 and are formed of good conducting material, such as copper, platinum, gold, silver, and the like.

The electrode 53 is interconnected to the lead 50 by a lead 55. The other electrode 54 is connected to the lead 38 previously described.

The two sides of the resistance bridge 40 are interconnected together by a lead 56 respectively interconnected to the leads 50 and 51 previously described.

In this manner, the direct current supplied by the rectifier 46 from the energized leads 18 and 19 is adapted to be delivered to one side of the resistance bridge 40 by the lead 41, whereby the direct current tends to divide and flow through the leads 42 and 43 to the lead 39 leading to the coil 35 of the relay 33 previously described. However, the total resistance provided by the variable resistors 48, 49, and 52, and the resistance of the liquid 13, cause the amperage of the current supplied to the lead 39 by the bridge 40 to drop.

Therefore, when the resistance value of the variable resistor 52 is increased, the total resistance value of the bridge 40 is increased, whereby the amperage of the current supplied by the bridge 40 to the coil 35 of the relay is decreased in accordance with the well-known principles of resistances disposed in parallel. Similarly, when the resistance value of the liquid 13 in the receptacle 12 is decreased in a manner hereinafter described, the total resistance value of the bridge 40 is decreased, whereby the amperage of the current supplied by the bridge 40 to the coil 35 is increased.

Since the embodiment of the coil 35 of the relay 33 illustrated in the drawings requires a current of approximately 0.025 ampere to energize the coil 35 thereof in a manner to open the switch 34, the variable resistor 52 is adjusted so that the current supplied to the coil 35 is approximately 0.002 ampere less than the required current of 0.025 ampere, for a purpose hereinafter described, when the liquid 13 has its normal resistance value.

The operation of the apparatus 10 and the method of this invention will now be described.

After the receptacle 14 has been formed in the above manner by closing off one end of the sleeve 16 by the desired test specimen 11, such as by a sheet of aluminum foil or the like, the receptacle 14 is immersed in the distilled water 13 contained in the receptacle 12. Thereafter, the corrosion means 15 is disposed in the receptacle 14, and, simultaneously therewith, the switch 23 of the relay 22 is manually closed, whereby the timer 17 is energized and begins to run. When the switch 23 is initially manually closed, the direct current supplied by the rectifier 31 energizes the coil 24 of the relay 22 to hold the switch 23 in its closed position.

Since the total resistance provided by the resistance bridge 40 is of such a value that the amperage of the current supplied by the rectifier 46 through the bridge 40 to the coil 35 of the relay 33 is below the amperage required to energize the coil 35 and thus open the switch 34 of the relay 33, the switch 34 of the relay remains closed, permitting the timer 17 to run.

However, upon the first microscopic pit formed through the test specimen 11 by the corrosion means 15, the ions of the corrosive liquid 15 diffuse into the liquid 13 under the influence of osmotic pressure and immediately lower the resistance value of the liquid 13 below its normal resistance value.

When the resistance value of the liquid 13 in the receptacle 12 is lowered by the mere presence of a microscopic amount of the corrosive liquid 15 entering the same through the test specimen 11, the total resistance value of the bridge 40 drops, causing the amperage of the current supplied to the coil 35 of the relay 33 to increase to a value that energizes the coil 35. When the coil 35 is energized, the switch 34 of the relay 33 opens, causing the timer 17 to stop and thus indicate the length of time it took the corrosive liquid 15 to eat through the test specimen 11.

When the switch 34 of the relay 33 is opened by the energized opening means or coil 35 of the relay 33, the current supplied to the holding coil 24 of the relay 22 is terminated, whereby the switch 23 opens. Thus, when the coil 35 is de-energized, the switch 34 automatically closes but the now opened switch 23 prevents further actuation of the timer 17 until the operator manually closes the same when he runs another test on a new test specimen.

In this manner, the apparatus 10 is adapted to immediately sense when the corrosive liquid 15 initially eats through the test specimen 11, so that an accurate reading on the timer 17 can be utliized to compute the corrosion rate of the test specimen 11 for the particular corrosive liquid 15 utilized.

Because the electrical resistance value of the liquid 13 in the receptacle 12 changes substantially with the first presence of the ions of the corrosive liquid 15 being diffused therein, the timer 17 accurately measures the length of time that it takes the corrosion means 15 to eat through the test specimen 11 without any time delay, and the timer 17 is automatically stopped without relying upon constant observation by the operator.

Accordingly, it can be seen that the method and apparatus of this invention accurately measure the corrosion rate of a desired test specimen without requiring any compensation for indeterminable time delay factors, as is required in prior-known apparatus and methods.

It is believed that no time delay is present in the operation of the apparatus 10, because it is not necessary for the corrosive liquid 15 entering the liquid 13 to be diffused therein to lower the resistance value of the distilled water 13. In fact, if the corrosive liquid or electrolyte 15 is unevenly diffused in the distilled water 13, a more rapid reaction of the circuit is produced and reduces any tendency for possible error of time measurement.

While the embodiment of the apparatus 10 illustrated in FIGURE 1 requires that the switch 23 be manually closed at the same time that the corrosive liquid 15 is being disposed in the receptacle 14, it is to be understood that some means could be provided for automatically starting the timer 17 when the corrosive liquid 15 is disposed in the receptacle 14.

For example, such an apparatus is illustrated in FIGURE 2, wherein parts thereof similar to parts illustrated in FIGURE 1 are designated by like reference numerals followed by a reference letter a.

In particular, the apparatus 10a illustrated in FIGURE 2 is similar to the apparatus 10 except that the relay 22 and associated elements thereof are eliminated, and relay 33a and associated elements are replaced by a relay which is normally closed but which opens when the coil 35a is energized and then remains open even when the coil 35a is de-energized. In place thereof, a pair of leads 57 and 58 are connected to adjacent separated ends of the main lead 18a and are respectively connected at the other ends thereof to a pair of electrodes 59 and 60 adapted to be disposed in the receptacle 14a. The electrodes 60 and 59 have non-conductive material disposed on the lower ends thereof to permit the electrodes to rest on the inner surface of the test specimen 11a, whereby the test specimen 11a does not act as a conductor between the electrodes.

The remaining portion of the apparatus 10a is identical and, therefore, such identical structure is not illustrated in FIGURE 2 as the same is readily apparent from FIGURE 1.

However, when the coil 35a of the relay 33a is energized, the switch 34a is opened and remains opened until the switch 34a is subsequently manually closed for a purpose hereinafter described.

The operation of the apparatus 10a will now be described.

With the switch 34a of the relay 33a closed, the electrodes 60 and 59 are disposed in the receptacle 14a before the corrosive liquid 15a is disposed therein. The timer 17 will be instantaneously energized when the corrosive liquid 15a is subsequently disposed in the receptacle 14a, because the corrosive liquid 15a will complete the circuit between the electrodes 59 and 60 to cause the timer 17 to operate.

When the coil 35a of the relay 33a is energized by the corrosive liquid 15a eating through the test specimen 11a and entering the liquid 13a in the receptacle 12a in the manner previously described for the apparatus 10, the switch 34a will open and thereby stop the timer 17 so that the corrosion rate of the test specimen 11a can be accurately calculated. The switch 34a of the relay 33a is constructed in such a manner that the switch 34a will remain open when the same is pushed open by the action of the energized coil 35a.

Therefore, it can be seen that the apparatus 10a is adapted to cause the timer 17 to automatically operate when the desired corrosive liquid 15a is disposed against the test specimen 11a.

While the various embodiments of this invention have illustrated the corrosive liquid 15 or 15a as being disposed in the receptacle 14 or 14a carrying the test specimens 11 or 11a, it is to be understood that the apparatus of this invention could be utilized with the corrosive liquid disposed in the outer receptacle 12 or 12a and with the liquid 13 or 13a having the resistance value thereof measured by the apparatus disposed in the receptacle 14 or 14a.

In particular, another embodiment of this invention is illustrated in FIGURE 3, and parts thereof similar to the parts illustrated in FIGURE 1 are indicated by like reference numerals followed by the reference letter b.

The apparatus 10b illustrated in FIGURE 3 has the desired corrosive liquid 15b disposed in the outer receptacle 12b and the electrodes 53b and 54b leading to the resistance bridge 40b are disposed in the receptacle 14b. The free ends of the electrodes 53b and 54b are protected with suitable non-conducting material so that the test specimen 11b will not complete a circuit therebetween when the free ends of the electrodes 53b and 54b rest on the test specimen 11b in the manner illustrated in FIGURE 3.

Since the remaining structure of the apparatus 10b is identical to the apparatus 10 illustrated in FIGURE 1, the remaining structure of the apparatus 10b is not illustrated in FIGURE 3.

The operation of the apparatus 10b will now be described.

After the receptacle 14b has been formed in the above manner, from the test specimen 11b, the receptacle is filled with distilled water 13b or other suitable liquid, and the electrodes 53b and 54b are disposed therein. Thereafter, the filled receptacle 14b is immersed into the corrosive means 15b carried in the receptacle 12b and, simultaneously therewith, the switch 23 of the relay 22 is closed, in the same manner as described for the embodiment illustrated in FIGURE 1, to cause the timer 17 to operate.

When the corrosive means 15b has eaten through the test specimen 11b, the ions thereof enter the liquid 13b disposed in the receptacle 14b and cause the resistance value thereof to drop to such a degree that the coil 35 of the relay 33 is energized in the manner previously described, to stop the operation of the timer 17.

Accordingly, it can be seen that improved methods and apparatus have been provided for accurately determining the corrosion rate of a desired test specimen without requiring any compensation for variations in test conditions, as is required in prior-known apparatus and methods.

While various specific embodiments of the parts of the apparatus of this invention are set forth above, it is to be understood that other types of resistors, capacitors, rectifiers, liquids, and the like, can be utilized, as the important feature of this invention is to substantially simultaneously sense the complete penetration of a test specimen by a desired corrosive liquid so that the corrosion rate of that test specimen can be accurately measured.

While the form of the invention now preferred has been disclosed as required by the statutes, other forms may be used, all coming within the scope of the claims which follow:

What is claimed is:

1. A method for measuring the rate of corrosion of a test specimen and comprising the steps of separating a desired corrosion means from a liquid by said test specimen, said liquid having a known electrical resistance when free of ions of said corrosion means, and measuring the elapsed time from the moment said corrosion means is placed in contact with said test specimen to the moment when the electrical resistance of said liquid changes due to the presence of ions of said corrosion means entering said liquid when said corrosive means eats through said test specimen whereby the corrosion rate of said test specimen can be determined.

2. A method as set forth in claim 1 wherein said liquid is distilled water.

3. A method as set forth in claim 1 wherein said test specimen is an aluminum-containing metallic material.

4. A method for measuring the rate of corrosion of a test specimen and comprising the steps of separating a desired corrosion means from a liquid by said test specimen, said liquid having a known electrical resistance when free of ions of said corrosion means, and sensing the change in electrical resistance of said liquid when said corrosion means eats through said test specimen and enters said liquid to change the electrical resistance thereof whereby the corrosion rate of said test specimen can be determined.

5. A method for measuring the rate of corrosion of a test specimen and comprising the steps of separating a desired corrosion means from a liquid by said test specimen, and automatically sensing the change in said liquid when said corrosive means eats through said test specimen and enters said liquid to determine the corrosion rate of said test specimen.

6. A method for measuring the rate of corrosion of a test specimen and comprising the steps of separating a desired corrosion means from a liquid by said test specimen, and automatically measuring the length of time it takes said corrosion means to eat through said test specimen and enter said liquid to change said liquid in order to determine the corrosion rate of said test specimen.

7. A method for measuring the rate of corrosion of a test specimen and comprising the steps of forming a receptacle from said test specimen whereby said test specimen provides at least part of a wall of said receptacle, disposing said receptacle into a body of liquid having a known electrical resistance with said test specimen in contact with said liquid, disposing a desired corrosion means in said receptacle with said corrosion means in contact with said test specimen, and measuring the elapsed time from the moment said corrosion means is placed in contact with said test specimen to the moment when the electrical resistance changes the electrical resistance thereof whereby the corrosion rate of said test specimen can be determined.

8. A method for measuring the rate of corrosion of a test specimen and comprising the steps of forming a receptacle from said test specimen whereby said test specimen provides at least part of a wall of said receptacle, disposing said receptacle into a body of liquid with said test specimen in contact with said liquid, disposing a desired corrosion means in said receptacle with said corrosion means in contact with said test specimen, and sensing the change in said liquid when said corrosion means eats through said test specimen and enters said liquid to determine the corrosion rate of said test specimen.

9. A method for measuring the rate of corrosion of a test specimen and comprising the steps of separating a desired corrosion means from a liquid by said test specimen, said liquid having a known electrical resistance when free of ions of said corrosion means, and measuring the elapsed time from the moment said corrosion means is placed in contact with said test specimen to the moment when the electrical resistance of said liquid changes due to the presence of ions of said corrosion means entering said liquid when said corrosion means eat through said test specimen whereby the corrosion rate of said test specimen can be determined, said corrosion means being a solution of sodium chloride.

References Cited by the Examiner

UNITED STATES PATENTS

| | | | |
|---|---|---|---|
| 2,679,752 | 6/1954 | Metler | 23—230 |
| 2,800,629 | 7/1957 | Tagg | 324—62 |
| 2,839,722 | 6/1958 | Marsh | 23—230 |
| 2,877,411 | 3/1959 | Schmidt | 324—62 |
| 2,888,642 | 5/1959 | Marsh et al. | 23—253 |
| 2,891,219 | 6/1959 | Camp | 324—62 |
| 2,897,060 | 7/1959 | Dieman | 23—230 |
| 2,963,349 | 12/1960 | Bernard et al. | 23—230 |

MORRIS O. WOLK, *Primary Examiner.*

ANTHONY SCIAMANNA, JAMES H. TAYMAN, JR.,
*Examiners.*

D. S. LILLY, *Assistant Examiner.*